United States Patent [19]

Piccolo et al.

[11] Patent Number: 4,533,556
[45] Date of Patent: Aug. 6, 1985

[54] KOLA FLAVORED CHEWING GUM AND PREPARATION THEREOF

[75] Inventors: Dominic J. Piccolo, Brooklyn, N.Y.; Deborah J. Feinerman, Asbury Park, N.J.

[73] Assignee: Warner-Lambert Company, Morris Plains, N.J.

[21] Appl. No.: 504,205

[22] Filed: Jun. 14, 1983

[51] Int. Cl.$^3$ .................. A23G 3/30; A23L 1/221
[52] U.S. Cl. ............................... 426/3; 426/534; 426/650; 426/651
[58] Field of Search ........................... 426/3–6, 426/650, 651, 534

[56] References Cited

U.S. PATENT DOCUMENTS

| 2,290,120 | 7/1942 | Thomas | 426/3 |
| 3,795,744 | 3/1974 | Ogawa et al. | 426/3 |
| 3,826,847 | 7/1974 | Ogawa et al. | 426/3 |
| 3,857,964 | 12/1974 | Yolles | 426/3 |
| 4,085,227 | 4/1978 | Mackay et al. | 426/3 |
| 4,157,401 | 6/1979 | Stroz | 426/3 |

FOREIGN PATENT DOCUMENTS 2345938 10/1977 France .................. 426/3

OTHER PUBLICATIONS

Winter, A Consumer's Dictionary of Food Additives, Crown Pub. Inc., New York, 1972, p. 136.
Furia et al., Ed's., Fenaroli's Handbook of Flavor Ingredients, 2nd ed., CRC Press, Ohio, 1971, 381–382.
Heath, Flavor Technology: Profiles, Products, Applications, Avi Pub. Co., Conn., 1978.

Primary Examiner—Jeanette Hunter
Attorney, Agent, or Firm—Daniel A. Scola, Jr.; Gary M. Nath

[57] ABSTRACT

A kola flavored chewing gum composition having in combination a natural kola extract with an oil soluble artificial kola flavor to produce a taste and flavoring perceptively similar to that associated with kola beverages. The improved kola flavoring and taste is believed to be critically dependent on the combination in specified ranges.

12 Claims, No Drawings

KOLA FLAVORED CHEWING GUM AND PREPARATION THEREOF

The instant invention relates to the enhancement of kola taste in a chewing gum through the addition of the combination of natural kola extract with an artificial kola flavor.

Heretofore a kola flavored chewing gum composition has not been disclosed which simulates the kola flavor of a soft drink. French Pat. No. 290,376, discloses a chewing gum containing stimulants selected from xanthines and their salts, and plant extracts containing xanthines such as extracts of kola, coffee, tea and coconut. The preferred xanthines are caffeine, theobromine, theophylline or mixtures of these, present in the amount of 1 to 10%. A preservative such as sodium benzoate and an absorbant for slow release of the stimulant, silicic acid, and cationic exchange resins are also present.

A new powdered chewing gum with kola flavored candy chips is disclosed in the journal of "Manufacturing Confectioner," Aug. 1982, page 14. This chewing gum is marketed by the Japanese company Pine.

A variety of chewing gum compositions containing either kola extract or kola flavor are known. Germany Offenlegundshrift No. 1,901,277, Aug. 6, 1979, discloses a chewing material containing sedative substances, e.g., cola extract, caffeine, hops extract etc., as a method simulating the effects of nicotine. This chewing gum was intended to help compensate excessive smokers who wish to smoke less.

U.S. Pat. No. 4,269,860, May 26, 1981 to Ogawa et al., disclose a gas developing chewing gum containing carbonate salt granules and sodium sulfate, fruit powder, organic acid, sugar and a flavoring ingredient. A process is claimed for preparing a gas-developing chewing gum by blending the above ingredients and then using the resulting mixture to either coat or fill the chewing gum. Flavors used in the carbonated beverage industry such as cola and cider are disclosed as useful. No indication as to the use of the kola extract in combination with kola flavor is given.

U.S. Pat. No. 3,826,847, July 3, 1974 to Ogawa et al, concerns the preparation of a chewing gum product containing spices and other seasonings which have been encapsulated or combined with high molecular weight compounds such as polyvinyl esters. Useful spices include bean-derived flavors such as coffee, cocoa and the like, wine flavors and pungent materials such as affinin, pepper and mustard.

A detailed review of masticatory bean and nut plants can be found in "Masticatoires et Fruits Tropicaux," Dupaigne, P., IRFA Journal, 1979, 35, pp 353–358. Additionally, other articles of interest include "Chewing Substances—from Coca to Chewing Gum," Benabai, A., Ann. Sanita Pubb. 1970, 31, pp 353–92; and "Plant Extracts for Flavors," E. G. Allison, in *American Perfumer Essential Oil Review,* S. B. Penick & Co., New York, N.Y., 58, pp 12931 (1951).

A discussion of the production of coca, cola and coca-cola flavor in beverages and confectionery is discussed in "Riechstoffe, Aromen, Kosmetica," Fed. Republic of Germany, 1978, 28, (b), 146–150, by Karg, J. E.

While chewing gum compositions have referred to kola flavors or to kola extract, they have not suggested the enhancement of the kola taste and flavor notes by the addition of the combination of kola extract and kola flavor to chewing gum. Additionally, the kola taste of kola beverages, with which the public has come to associate, has not been duplicated or simulated in a chewing gum composition.

The term "kola" is generally used interchangeably with the term "cola" which commonly denote beverage products containing artificial kola flavors. The taste and flavor notes of these artificial kolas are now associated by the consuming public as that which is truly a kola flavor. This is, however, not the case, since the natural essence or extract of the kola nut provides a very different taste, imparting an astringent, acidic or bitter quality.

The term kola is understood in the art as that material derived from the dried cotyledon of the plant family Sterculiaceoe. *Cola nitida, Sterculia acuminata* and *Cola vera* are among the well known species useful in the instant invention. Other species of the kola family are contemplated and the selection of one over the other is not critical to the understanding of the invention, and is deemed to be well within the skill of the art and can be selected by routine experimentation for taste and flavor. The distilled odor of these natural flavorings are similar to the cocoa bean, being somewhat characteristically aromatic and have a bitter-sweet taste. Generally speaking the organic make-up of the kola extract includes starches, sugars, caffeine and theobromine.

There are three basic varieties of kola nuts obtainable from the species *Cola nitida.* They include the kola of Sakhala, which is white in color; the kola of Kassi, Siarra and Toute which is red or white in color; and the kola of Maninian which is red. Of the white kola there are two varieties, one whitish, resembling the kola of Sakhala but smaller in size; the other more or less rose-colored and larger in size. These varieties of kola as well as the other known varieties are useful in producing the kola flavorings of the instant invention.

It is critical to the flavorings of the instant invention that both natural kola extract and artificial cola flavoring be employed in combination to impart to chewing gum the kola flavor recognizable by kola beverage drinkers. The artificial flavor should be oil-soluble and present in the amounts of about 0.05% to about 5%, and preferably about 0.5% to about 1.0% by weight of the total chewing gum composition. Natural kola extract, in a aqueous solution, should be present in the amounts of about 0.05% to about 2.0%, and preferably about 0.5% to about 0.75% by weight of the total chewing gum composition. Amounts of kola extract above 2% are not normally acceptable since such high amounts overpower the flavor oil giving an objectionable taste to the resulting product. In contrast, amounts below about 0.05% do not have an effect on flavor perception.

While the respective amounts given above may be varied within the ranges by a person reasonably skilled in the art according to the desired taste, a delicate balance between the extract and the artificial flavoring should be maintained to avoid excess astringency, bitterness and/or spicyness. The aim of the instant invention is to prepare a kola flavored chewing gum which is close in flavor to that which the consumer has come to recognize in kola flavored beverages.

Artificial kola flavors are generally comprised of a mixture of natural or artificial lemon or lime flavors or oils with a variety of spices, such as cloves, nutmeg, cinnamon, cinnamic aldehydes, ginger and the like. The proper balancing of these ingredients is extremely difficult and the impact of the overall kola taste is often diminished by dominating spice notes.

The chewing gum compositions of this invention are those which, except for the unique kola flavoring, are known in the art. The gum base used in the instant invention may be any water-insoluble gum base well known in the art. Illustrative examples of suitable polymers in gum bases include both natural and synthetic elastomers and rubbers. For example, those polymers which are suitable in gum bases include, without limitation, substances of vegetable origin such as chicle, jelutong, gutta percha and crown gum. Synthetic elastomers such as butadiene-styrene copolymers, isobutylene-isoprene copolymers, polyethylene, polyisobutylene and polyvinylacetate and mixtures thereof, are particularly useful.

The amount of gum base employed will vary greatly depending on various factors such as the type of base used, consistency desired and other components used to make the final product. In general, amounts of about 5% to about 45% by weight of the final chewing gum composition are acceptable for use in chewing gum compositions with preferred amounts of about 15% to about 25% by weight.

The gum base composition may contain elastomer solvents to aid in softening the rubber component. Such elastomer solvents may comprise methyl, glycerol or pentaerythritol esters of rosins or modified rosins, such as hydrogenated, dimerized or polymerized rosins or mixtures thereof. Examples of elastomer solvents suitable for use herein include the pentaerythritol ester of partially hydrogenated wood rosin, pentaerythritol ester of wood rosin, glycerol ester of partially dimerized rosin, glycerol ester of polymerized rosin, glycerol ester of tall oil rosin, glycerol ester of wood rosin and partially hydrogenated wood rosin, and partially hydrogenated methyl ester of rosin and mixtures thereof. The solvent may be employed in an amount ranging from about 10% to about 75% and preferably about 45% to about 70% by weight of the gum base.

A variety of traditional ingredients used as plasticizers or softeners such as lanolin, stearic acid, sodium stearate, potassium stearate, glyceryl triacetate, glycerine and the like, may also be incorporated into the gum base to obtain a variety of desirable textures and consistency properties. These individual additional materials are generally employed in amounts of up to about 30% by weight and preferably in amounts of from about 3% to about 7% by weight of the final gum base composition.

The chewing gum compositions employing the instant gum bases generally contain sweetening agents. The sweetening agent may be selected from a wide range of materials including water-soluble agents, water-soluble artificial sweeteners, and dipeptide based sweeteners, including mixtures thereof. Without being limited to particular sweeteners, representative illustrations encompass:

A. Water-soluble sweetening agents such as monosaccharides, disaccharides and polysaccharides such as xylose, ribose, glucose, mannose, galactose, fructose, dextrose, sucrose, sugar, maltose, partially hydrolyzed starch or corn syrup solids, hydrogenated starch hydrolysate and sugar alcohols such as sorbitol, xylitol, mannitol and mixtures thereof.

B. Water-soluble artificial sweeteners such as the soluble saccharin salts, i.e., sodium or calcium saccharin salts, cyclamate salts, acesulfam-K and the like, and the free acid form of saccharin.

C. Dipeptide based sweeteners such as L-aspartyl-L-phenylalanine methyl ester and materials described in U.S. Pat. No. 3,492,131 and the like.

In general, the amount of sweetener will vary with the desired amount of sweetener selected for a particular chewing gum. This amount will normally be 0.01% to about 90% by weight when using an easily extractable sweetener. The water-soluble sweeteners described in category A above, are preferably used in amounts of about 25% to about 75% by weight, and most preferably from about 50% to about 65% by weight of the final chewing gum composition. In contrast, the artificial sweeteners described in categories B and C are used in amounts of about 0.005% to about 5.0% and most preferably about 0.05% to about 2.5% by weight of the final chewing gum composition. These amounts are ordinarily necessary to achieve a desired level of sweetness independent from the flavor level achieved from flavor oils.

The chewing gum composition of this invention may additionally include the conventional additives of coloring agents such as titanium dioxide; emulsifiers such as lecithin and glyceryl monostearate; and fillers such as aluminum hydroxide, alumina, aluminum silicates, dicalcium phosphate, talc and combinations thereof. Preferable the amount of fillers when used will vary from about 25% to about 45% by weight of the gum base.

A preferred formulation of the invention comprises the following chewing gum component in addition to the kola flavor and kola extract.

Gum base in the amount of about 8% to about 30%; liquid sweetener in the amount of about 10% to about 30%; softeners in the amount of about 0.05% to about 10%; particulate sweetener in the amount of about 20% to about 80%; emulsifiers in the amount of about 0.05% to about 5%; all percents being by weight of the total composition.

The present invention also relates to a method for the preparation of the present chewing gum composition which method in its broadest aspects comprises combining the gum base, liquid sweetener and softeners with each other to form a first mixture. This blending operation is performed by conventional means while heating the gum base to plasticize the blend. The heating temperature may vary widely but is for practical purposes preferable about 70° C. to 120° C. This mixture is then blended with the sugar, coloring agent optional filler and kola extract. The extract may be blended directly as described or premixed with a portion of the sugar to aid in its distribution during blending. After the ingredients have been blended for a few minutes the remaining components are added, such as the flavor oil, and softeners such as glycerin and water.

The present method contemplates the incorporation of the kola extract into the gum base mix before addition of the primary flavor oil. Specifically, the kola extract is added to the gum base mix and partially or thoroughly mixed therewith be blending to form a homogenous mass. It is generally noted that the foregoing steps result in the formation of kola extract being interdispersed in the initial gum base mix. The extract is accordingly uniformly distributed throughout the gum base matrix and thereby is assured of proper release during chewing resulting in a synergistic flavor effect with the flavor oil.

The addition of particulate material, plasticizers, softeners and so forth may comprise a sequence of incremental additions. Each addition may be followed by thorough mixing with the primary bath of gum base to achieve final uniformity. As noted above, the liquid flavor is introduced into the gum base mix last, primarily to avoid volitization of flavor oil fractions. Since the kola extract is highly viscuous and is not generally affected by high processing temperatures its addition during addition of the particulate matter aids in its dispersion within the final formulation.

The chewing gum compositions of the instant invention may be of the bubble gum variety, the stick gum variety, non-adhesive, sugarless or combinations thereof, without detracting from the purpose and essence of the invention.

The following examples serve to provide further appreciation of the invention but are not meant in any way to restrict the effective scope of the invention. All percentages throughout the specification are by percent by weight of the final composition unless otherwise indicated.

EXAMPLE [INVENTIVE RUNS A TO D AND COMPARATIVE RUNS 1 TO 45]

An expert panel was chosen to evaluate a series of kola flavorings in chewing gums both for the initial burst of flavor and the subsequent release of flavor character. Table II below lists a series of chewing gum compositions employing a variety of commercially available natural and/or artificial kola flavorings as compared with the compositions of the instant invention using the natural extract and flavor oil in combination. The same chewing gum composition was used for all the flavors tested, as set out in Table I. The panel rated the flavors as acceptable or not acceptable with comments directed toward the latter.

The formulations were prepared by melting the gum base in a steam jacketed kettle equipped with a sigma blade mixer at a temperature of about 88° C. to about 105° C.

The corn syrup and caramel paste was then added and mixed with the base to disperse the ingredients throughout the gum base.

Thereafter a quantity of particulate sugar, malic acid, the color which was premixed with a portion of the sugar, and the kola extracts likewise previously premixed with a portion of the sugar (both using about 0.05%–5% sugar) were added and mixed with the gum base for about 2 to 4 minutes. This procedure was followed as it results in a greater ease of dispersion of the kola extract in the formula.

The remaining materials added include glycerin, water and the liquid flavor. The mixture was blended until a homogenous mass resulted normally 2 to 3 minutes. The pliable mass was then removed from the kettle, rolled and cut into chewing gum pieces.

The panel chewed the chewing gum for approximately five (5) minutes prior to evaluation. As evidenced by Table II, the flavor oils used alone (sample Runs 1–44) were adjudged to be not acceptable by the expert panel due to an imbalance of spices, citrus taste or lack of kola impact. The flavor of the kola beverages known in the art were the baseline for the comparison.

In Run 45 only kola extract was added to the chewing gum formulation without addition of flavor oils. The flavor exhibited an imbalance of taste and completely unlike kola flavor as normally preceived.

It should be noted that three flavor oils were partially acceptable, namely oil numbers 4, 16 and 44. These oils demonstrated partially acceptable kola flavors as far as balance of lemon/lime and spicy material. However, they are still too far away from taste perception of a kola beverage flavor. Addition of the kola extract in inventive Runs A to D enhanced the kola perception without concomitant increase in bitter taste.

The instant invention embodied in samples A, B, C and D, were adjudged to have a superior kola flavor and a close simulation in taste to that of kola beverages.

The invention being thus described, it will be obvious that the same may be varied in many ways. Such variations are not to be regarded as a departure from the spirit of scope of the invention and all such modifications are intended to be included within the scope of the claims.

TABLE I

|  | % by weight |
|---|---|
| Gum base | 17.0 |
| Corn syrup | 25.0 |
| Caramel paste | 2.0 |
| Particulate sugar | 53.7 |
| Glycerin | 0.3 |
| Water | 0.3 |
| Malic acid | 0.75 |
| Color | 0.14 |

TABLE II

| Kola Flavor Sample | % by weight of chewing gum composition | Acceptable (A) Partially acceptable (PA) Not acceptable (NA) | Comments |
|---|---|---|---|
| (1) Artificial | 0.75 | NA | Too spicy |
| (2) Artificial | 0.75 | NA | Too citrusy |
| (3) Natural & Artificial | 0.75 | NA | High cinnamic aldehyde |
| (4) Artificial | 0.75 | PA | Good kola character but limey |
| (5) Artificial | 0.75 | NA | Too cinnamony |
| (6) Artificial | 0.75 | NA | Strong clove note |
| (7) Artificial | 0.75 | NA | Too much citrus |
| (8) Artificial | 0.75 | NA | Too much lemon-lime taste |
| (9) Natural & Artificial | 0.75 | NA | Too sweet |
| (10) Natural & Artificial | 0.75 | NA | High nutmeg notes |
| (11) Natural & Artificial | 0.75 | NA · | High cinnamic aldehyde |
| (12) Artificial | 0.75 | NA | Limey with high ginger |

TABLE II-continued

| Kola Flavor Sample | % by weight of chewing gum composition | Acceptable (A) Partially acceptable (PA) Not acceptable (NA) | Comments |
|---|---|---|---|
| (13) Natural & Artificial | 0.75 | NA | note Low kola impact |
| (14) Artificial | 0.75 | NA | Too sweet |
| (15) Artificial | 0.75 | NA | Vanilla-like, fruity |
| (16) Artificial | 0.75 | PA | Lemon-lime |
| (17) Natural & Artificial | 0.75 | NA | High cinnamon |
| (18) Artificial | 0.75 | NA | Too limey |
| (19) Artificial | 0.75 | NA | Spice dominates lime notes |
| (20) Artificial | 0.75 | NA | High lime |
| (21) Artificial | 0.75 | NA | Grass-like flavor |
| (22) Artificial | 0.75 | NA | Perfumey |
| (23) Natural & Artificial | 0.75 | NA | High eugenol/lime |
| (24) Natural & Artificial | 0.75 | NA | High clove |
| (25) Artificial | 0.75 | NA | Low cola impact |
| (26) Natural & Artificial | 0.75 0.75 | NA | High clove |
| (27) Artificial | | NA | Too spicy |
| (28) Natural & Artificial | 0.75 0.75 | NA | Out of balance - high clove |
| (29) Natural & Artificial | 0.75 0.75 | NA | Too spicy |
| (30) Artificial | 0.50 | NA | Low impact |
| (31) Artificial | 0.50 | NA | Low impact nondescript |
| (32) Natural & Artificial | 0.50 | NA | Low impact nondescript |
| (33) Artificial | 0.50 | NA | Nondescript; low impact |
| (34) Natural & Artificial | 0.75 0.75 | NA | Floral/citrus notes |
| (35) Natural & Artificial | 0.75 | NA | Floral/citrus notes |
| (36) Natural & Artificial | 0.75 | NA | Floral |
| (37) Natural & Artificial | 0.75 | NA citrus notes | High vanilla/ |
| (38) Artificial | | NA | Lime & cooked milk notes |
| (39) Artificial | 0.75 | NA | High citrus |
| (40) Artificial | | NA | Vanilla dropped out |
| (41) Artificial | 0.75 | NA | High lemon-lime |
| (42) Natural & Artificial | 0.75 | NA | High spice |
| (43) Artificial | 0.75 | NA | High citrus |
| (44) Artificial | 0.75 | PA | Spicy |
| (45) Kola extract | 0.5 | NA | No kola-like flavor |
| A. Artificial kola flavor (Run 44) | 0.75 | A | Excellent |
| Natural kola extract | 0.5 | | Kola beverage type flavor |
| B. Artificial kola flavor (Run 4) | 0.5 | A | Excellent |
| Natural kola extract | 0.5 | | Kola beverage type flavor |
| C. Artificial kola flavor (Run 16) | 0.75 | A | Excellent |
| Natural kola extract | 0.5 | | Kola beverage type flavor |
| D. Artificial kola flavor (Run 4) | 0.75 | | Excellent |
| Natural kola extract | 0.5 | A | Kola beverage type flavor |

What is claimed is:

1. A kola flavored chewing gum composition having improved perceptable kola flavor wherein the improvement comprises the addition of the combination of an artificial oil-soluble kola flavor in the amounts of about 0.05% to about 5.0% and natural kola extract in the amounts of 0.05% to about 2.0%, percents being by weight of the total composition.

2. The kola flavored chewing gum composition of claim 1 wherein the artificial kola and the natural kola extract are present in the amounts of about 0.5% to about 1.0% and about 0.5% to about 0.75% respectively by weight of the total composition.

3. The kola flavored chewing gum composition of claim 1 wherein the remaining chewing gum components comprise:
   (a) gum base in the amount of about 5% to about 45%;
   (b) liquid sweetener in the amount of about 10% to about 30%;
   (c) softeners in the amount of about 0.05% to about 10%;
   (d) particulate sweetener in the amount of about 20% to about 80%;
   (e) emulsifiers in the amount of about 0.05% to about 5%; all percents being by weight of the total composition.

4. The kola flavored chewing gum composition of claim 1 wherein the kola extract is derived from the species *Cola nitida*.

5. The kola flavored chewing gum composition of claim 1 wherein the kola extract is derived from the species *Sterculia acuminata*.

6. The kola flavored chewing gum composition of claim 4 wherein the species is of the white variety, red variety or brown variety.

7. The chewing gum composition of claim 3 wherein the gum base comprises a natural or synthetic rubber and a filler.

8. The chewing gum composition of claim 7 wherein the natural rubber is selected from the group consisting of chicle, jelutong, balata, gutta-percha, lechi caspi, sorva and mixtures thereof.

9. The chewing gum composition of claim 7 wherein the synthetic rubber is selected from the group consisting of butadiene-styrene copolymers, polyisobutylene, isobutylene-isoprene copolymers and mixtures thereof.

10. The chewing gum composition of claim 3 wherein the liquid and particulate sweetener are selected from the group consisting of water-soluble sweetening agents, water-soluble artificial sweeteners, dipeptide based sweeteners and mixtures thereof.

11. The composition of claim 1 additionally containing a material selected from the group consisting of coloring agents, emulsifiers, fillers, plasticizers and mixtures thereof.

12. A kola flavored chewing gum composition having improved perceptable kola flavor comprising:
   (a) about 8% to about 30% by weight of the composition of a gum base comprising:
       (i) a natural or synthetic rubber selected from the group consisting of chicle, jelutong, balata, gutta-percha, lechi caspi, sorva, butadiene-styrene,
       (ii) a particulate filler
   (b) a liquid corn syrup sweetener in the amount of about 10% to about 30% by weight of the total composition;
   (c) a particulate sweetener in the amount of about 20% to about 80% by weight of the total composition and said sweetener selected from the group consisting of natural water-soluble sweeteners, artificial water-soluble sweeteners and dipeptide based sweeteners;
   (d) a particulate sweetener in the amount of about 20% to about 80% selected from the class consisting of granulated sugar, polyhydric alcohols, and saccharine and mixtures thereof;
   (e) softeners in the amount of about 0.05% to about 10% by weight of the total composition selected from the group consisting of the methyl, glycerol, and pentaerithritol esters of wood rosin and mixtures thereof;
   (f) a mixture of an artificial oil-soluble kola flavor with a natural kola extract in the respective amounts of about 0.05% to about 5.0% and 0.05% to about 2.0% by weight of the total composition; and
   (g) an emulsifier in the amount of about 0.05% to about 5% by weight of the total composition.

* * * * *